June 3, 1930. A. J. FLEITER 1,762,119
VULCANIZER
Filed Aug. 12, 1927 2 Sheets-Sheet 1
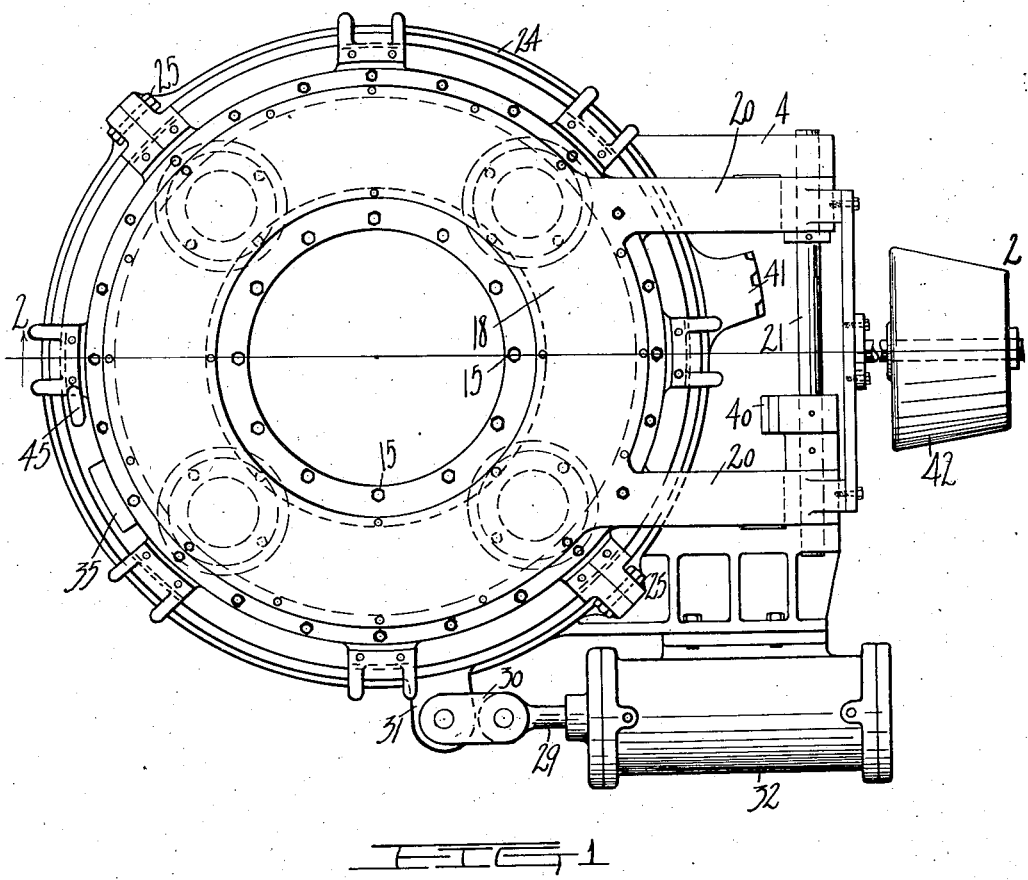
INVENTOR.
Andrew J. Fleiter.
BY
Ely H Barrow
ATTORNEYS.

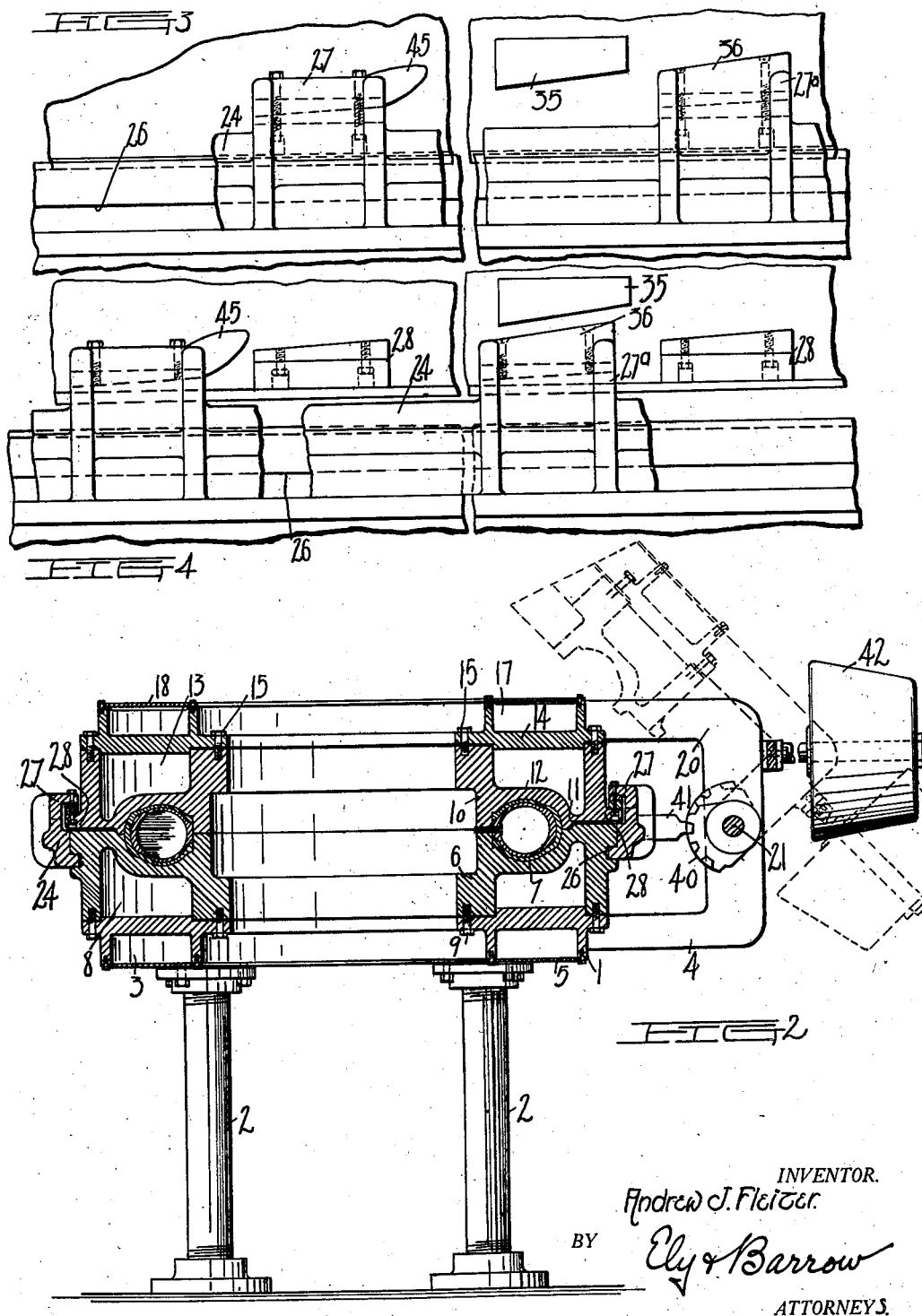

Patented June 3, 1930

1,762,119

UNITED STATES PATENT OFFICE

ANDREW J. FLEITER, OF AKRON, OHIO, ASSIGNOR TO THE AKRON STANDARD MOLD COMPANY, OF AKRON, OHIO, A CORPORATION OF OHIO

VULCANIZER

Application filed August 12, 1927. Serial No. 212,533.

The present invention relates to vulcanizers, and particularly to vulcanizers for the curing of pneumatic tires or tubes, the object of the invention being to improve upon previous constructions of this general nature.

Specifically, the invention relates to a form of vulcanizer in which the mold may be utilized either with the individual swinging type of vulcanizer or is adaptable for use in the pot or stationary vulcanizer. The machine is designed so that the sections of the mold may be secured to a stationary and a swinging member of a vulcanizer and, if removed therefrom, may be stacked upon one another in the usual vertical or pot vulcanizer.

The advantage of this arrangement resides in the adaptability of the device for either type of curing, making the molds interchangeable for either system.

Another feature of the invention is the improvement in the form of the rotating locking ring which is otherwise of the usual or customary type, having wedge-shaped cams or lugs to force the mold sections together. The improvement resides in the addition of a fast operating cam which is designed to engage the lug on the swinging or movable mold section so that if the latter is not fully closed, the ring will operate to bring the mold sections together preparatory to the operating of the final clamping devices.

The invention is illustrated in its preferred form, this showing, however, being for the purposes of illustration and not intended to limit embodiments of the invention to exact conformity with the details as shown.

In the drawings:

Figure 1 is a plan view of the improved vulcanizer;

Figure 2 is a section on the line 2—2 of Figure 1;

Figure 3 is a fragmentary side elevation of the locking ring, the mold being locked or clamped together; and Figure 4 is a similar view showing the mold partially closed or ajar.

The apparatus comprises a base plate or main support 1 which is supported upon a plurality of pillars or standards 2. Formed as a part of the base plate is a bracket having outwardly extending arms 4 forming the stationary elements of a hinge upon which the sections of the vulcanizer are movable relatively to one another.

The base plate is preferably cast with a chamber 3 which is closed by a plate 5, thereby forming an insulating chamber which will operate to conserve the heat of the mold sections.

To the upper surface of the plate 1 is secured the mold member 6, formed on its upper surface with a cavity 7 forming one side of the vulcanizing chamber. The mold is illustrated herein as designed for the vulcanization of a pneumatic tire, but it can be adapted for the vulcanization of tubes or other articles as may be desired. The under or outer side of the mold member is formed with an open cavity or recess 8 about its periphery which, being closed by the plate 1, constitutes the steam chamber. It will be observed that the inner and outer peripheries of the mold are at the same level, being attached to the plate 1 by bolts 9.

The upper mold member 10 is similar to the member 6, the members being registered by a flange and groove 11. The molding cavity is indicated by 12 and the steam cavity by 13. The member 10 is attached to a plate 14 by bolts 15 passing through the flanges about the inner and outer peripheries of the mold. The plate 14 is provided with a hole at its center for access to the interior of the mold and with a chamber 17 for insulating purposes, closed by a plate 18. Suitable packing is provided about the edges of the mold members on the upper and lower mold sections.

The plate 14 is attached to and carried by a hinge member 20 complementary to the hinge member 4 and pivoted thereto by a shaft 21, the arms of the hinge member 20 and the shaft 21 being keyed or pinned together.

The two mold members are held together by means of a rotating clamping ring 24 which is formed in two parts connected by lugs and bolts 25. The ring is seated in a groove 26 on the lower mold section and is provided with spaced lugs 27 having wedge-shaped under surfaces engaging correspondingly shaped lugs 28 on the upper mold member. The ring is rotated to lock or unlock the mold members by means of a piston 29 attached by link 30 to a lug 31 on the ring and moved by a cylinder 32 mounted on the side of the vulcanizer.

In order to break the adhesion between the mold sections after the vulcanizing operation is completed and to give the mold its first opening movement, the upper or movable mold section is provided with a projecting breaking lug 35 which is located at the side of the mold opposite the hinge member and lies within the path of one of the clamping members 27ª which is provided with an inclined extension 36 to engage the similarly shaped under surface of the lug 35 so that as the clamping ring moves toward open position the extension 36 is moved against the under side of the lug 35 and forces the mold sections apart, or performs what is known as the "cracking" of the mold.

In order to swing the upper mold section to open position, as shown by dotted lines in Figure 2, the shaft 21 has attached thereto a spiral gear segment 40 which is located within the path of a short spiral gear 41 on the ring. As the ring moves to open position, the engagement of the gears 40 and 41 will swing the upper mold section to full open position. The upper section is provided with a counterweight 42.

When the mold is refilled and closed, the movement of the ring in the opposite direction, through the intermeshing gears, will move the upper mold section to closed position. As it is possible that the mold section will not thereby close sufficiently to permit engagement of the parts 27 and 28, the ring is provided with a single, rapidly operating lug to engage the upper mold section and move it to a position which the clamping lugs will fully engage. This fast lug is indicated by the numeral 45, being located at a point remote from the hinge to initially engage the adjacent lug 28 and move the upper section into engagement with the lower section. This preliminary closing or drawing operation is a valuable adjunct to the locking ring and insures engagement of the main clamping lugs as the ring moves to its final locking position.

If the mold is to be used in the vertical press or pot vulcanizer, the sections are detached from the plates 1 and 14 and are used as in former systems. The outer surfaces of the mold sections are plane and smooth and the molds can be stacked in exactly the same manner as the usual molds in use in the press system, the plane surfaces on the molds permitting them to slide over one another as they are stacked within or removed from the press. In this manner the manufacturer is allowed to use either system with the expense of a single set of molds, it being necessary merely to loosen the sections from the plates and dismount the clamping ring.

The connections for the introduction of steam into the chambers on the upper and lower mold members are not illustrated, nor are the connections for the air bag, as usual or standard practice may be observed in respect to both of such matters.

What is claimed is:

1. In a vulcanizer, the combination of two plates hinged together, molds consisting of mold members removably secured to the faces of the plates, and means to clamp the mold members together while secured on said plates, the outer surfaces of the mold members lying in common planes so that when molds are detached from the plates they may be stacked by lateral movement of one mold over the face of a second mold.

2. In a vulcanizer, the combination of two plates hinged together, molds consisting of mold members removably secured to the faces of the plates, and a rotating clamping ring to secure the mold members together while secured on said plates, the outer surfaces of the mold members lying in common planes so that when molds are detached from the plates they may be stacked by lateral movement of one mold over the face of a second mold.

ANDREW J. FLEITER.